Sept. 30, 1969 R. A. KAENEL ET AL 3,470,543

MAGNETIC WIRE GATING CIRCUIT

Filed March 4, 1966 2 Sheets-Sheet 1

INVENTORS R. A. KAENEL
J. L. SMITH

BY Herbert M. Shapiro
ATTORNEY

Sept. 30, 1969 R. A. KAENEL ET AL 3,470,543

MAGNETIC WIRE GATING CIRCUIT

Filed March 4, 1966 2 Sheets-Sheet 2

United States Patent Office 3,470,543

Patented Sept. 30, 1969

3,470,543

MAGNETIC WIRE GATING CIRCUIT

Reginald A. Kaenel, Chatham, and James L. Smith, Bedminster, N.J., assignors to Bell Telephone Laboratories, Incorporated, New York, N.Y., a corporation of New York Filed Mar. 4, 1966, Ser. No. 531,706

Int. Cl. H03k 17/30

U.S. Cl. 340—174 6 Claims

ABSTRACT OF THE DISCLOSURE

Magnetic domain wall media are linked together by a plurality of transfer loops. The expansion of domains in one wire followed by the collapse of those domains generates pulses sufficient to nucleate domains in the second for propagation to a detector. When domains are generated in the first wire selectively in response to telephone off-hook currents, the first wire functions as a gate providing complete decoupling between the fields associated with the off-hook currents and the second wire.

This invention relates to information gating circuits and, more particularly, to magnetic wire gating circuits.

Magnetic wire devices appear to be particularly promising from an economic standpoint. Such devices are usually operated such that a reverse magnetized domain is provided, during a write operation, in a limited portion of the wire in response to a first (nucleation) field in excess of a nucleation threshold and is advanced through the wire, during a propagation operation, in response to spaced apart second (propagation) fields in excess of a propagation threshold and less than the nucleation threshold, as is well known.

The intrinsic margins characteristic of such "domain wall" devices are determined by the difference between the propagation and the nucleation threshold. Specifically, the nucleation to propagation threshold ratio of a magnetic wire shift register is desirably high to tolerate expected variations in both nucleation and propagation pulses and to permit adequate propagation speeds without nucleating spurious reverse domains. Materials which provide nucleation to propagation threshold ratios of ten to one and better are known. Unfortunately, wires of such material do not, as yet, have uniform characteristics. Consequently, the operating margins achieved in practice are determined by the ratio between the minimum nucleation threshold and the maximum propagation threshold which, although quite satisfactory for many purposes, is not as large as may otherwise have been realized.

One must bear in mind that, although nucleation to propagation threshold ratios are desirably high, a high nucleation threshold is wasteful of power during write-in operations and a low propagation threshold permits increased sensitivity to stray fields. Compatibility with existing power supplies and utilization circuits indicates the choice of magnetic characteristics; nonuniformity of the magnetic material forestalls the full realization of the expected margins. The problems then is, in the first instance, one of nonuniformity of magnetic materials in the domain wall device.

In one particular use of such a domain wall device, the condition of a plurality of associated telephone lines is scanned. Such operation is described in U. F. Gianola-R. A. Kaenel-H. E. D. Scovil patent application Ser. No. 464,066, filed June 15, 1965, now Patent No. 3,430,001. In the operation description therein, a filed of a value in excess of the nucleation threshold is provided at a plurality of positions along a magnetic (scanner) wire of a domain wall device for nucleating reverse magnetized domains of unstable length. The presence of off-hook currents in associated telephone lines provides additional fields for expanding the domain to a stable length at corresponding ones of these positions. The off-hook currents persits, however, and consequently are held to below levels at which they would provide fields which interfere with subsequent propagation operations. It is clear, then, that the operating margins in this mode of operation are further reduced from the intrinsic margins for domain wall devices.

Of course, this reduction may be minimized or even obviated if a means were provided to decouple input circuitry from the magnetic wire during a "prewrite" operation and if transfer of information were then carried out in a controlled manner during a write operation. If this were the case, wider variations in input amplitudes and durations would be tolerable.

Gating circuits provide such decoupling. Available gating circuits, however, are expensive and diminish the economic advantages of magnetic wire implementations. Moreover, such circuits frequently are characterized by problems some of which are not easily resolved when used with wire implementations. For example, magnetic core gating circuits have an inadequate threshold sensitivity, are too sensitive to temperature changes to be used advantageously with the wire implementations, and have been found to provide imperfect decoupling.

Accordingly, an object of this invention is to provide a new and novel gating circuit.

The foregoing and further objects of this invention are realized in one embodiment thereof wherein first and second domain wall wires are coupled to one another by a plurality of transfer loops. In response to input (off-hook) currents to be sensed, reverse domains are nucleated in the first (gate) wire adjacent corresponding ones of the transfer loops. Periodically, gating fields are applied to the first wire to expand the domain to encompass the corresponding transfer loop. The first wire is later reset inducing pulses in the corresponding transfer loops for nucleating reverse domains in corresponding positions of the second (scanner) wire. Information is processed in the second wire, for example, as described in the aforementioned copending application.

Accordingly, a feature of this invention is a new and novel magnetic wire gating circuit.

The foregoing and further objects and features of this invention will be understood more fully from a consideration of the following detailed description rendered in conjunction with the accompanying drawing, wherein.

Figure 1:
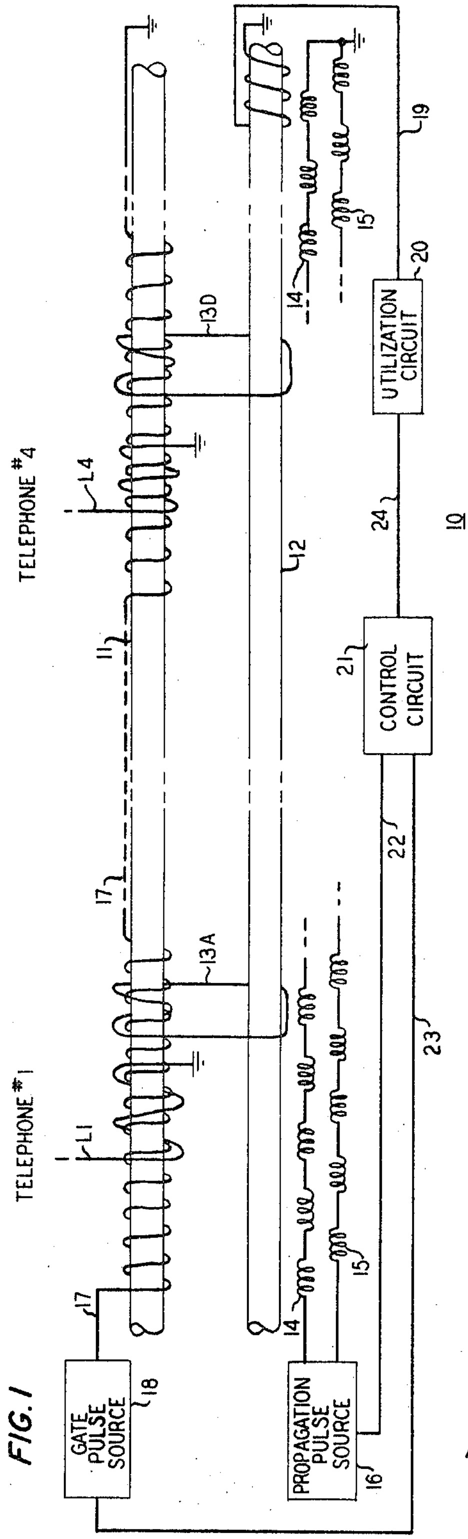
FIG. 1 is a schematic illustration of a gating circuit in accordance with this invention.

Specifically, FIG. 1 shows a gating circuit 10 in accordance with this invention. The circuit includes a magnetic domain wall wire 11. Spaced apart positions along wire 11 are coupled to corresponding positions of a second (scanner) domain wall wire 12 by transfer loops 13A, 13B . . . . Representative transfer loops 13A and 13D, shown in FIG. 1, have a two-to-one turns ratio as is common for overcoming transfer losses in such loops. A one-to-one turns ratio is useful if transfer of information therein provides fields at the corresponding positions of wire 12 to add to the propagation fields concurrently applied to those positions.

Representative lines L1 and L4 associated with telephones #1 and #4 (not shown) respectively, for example, are coupled to positions along wire 11. The position to which each of lines L1 and L4 is coupled is displaced from a position coupled by a corresponding transfer loop. Lines L1 and L4 may be two-wire telephone auxiliary lines, as is common, or a grounded single wire as shown.

Propagation conductors 14 and 15 couple spaced apart positions along wire 12. Specifically, each of conductors 14 and 15 includes a set of coils of alternating sense. The coils of the two conductors are interleaved such that when a four-phase propagation pulse sequence, for example, two positive followed by two negative pulses is applied in the well known manner, a reverse domain in wire 12 propagates from left to right as viewed. The coils of the propagation conductors are dimensioned such that two adjacent coils correspond to a bit location (position) in the domain wall wire. Therefore, one propagation sequence is required to move a reverse domain from one bit position to a next adjacent bit position spaced a "buffer region" apart. The conductors, 14 and 15, are connected between a propagation pulse source 16 and ground.

A conductor 17, connected between a gate pulse source 18 and ground, illustratively couples the entire wire 11. An output portion of wire 12 is coupled by a conductor 19 which is connected between a utilization circiut 20 and ground.

Propagation pulse source 16, gate pulse source 18, and utilization circuit 20 are connected to a control circuit 21 via conductors 22, 23 and 24, respectively. The various sources and circuits may be any such elements capable of operating in accordance with this invention.

It is convenient to illustrate the operation of the circuit of FIG. 1 in terms of the line scanner operation described in the aforementioned copending application. In that context, the utility of the circuit of FIG. 1 is demonstrated by showing the operation when an off-hook current is present in, for example, line L1 and no off-hook current is present in line L4.

Figure 2:
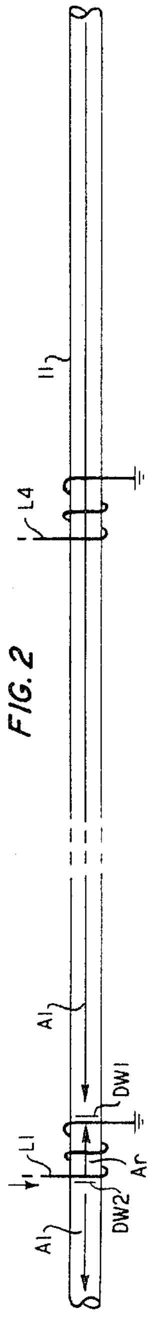
FIGS. 2 through 4 are schematic illustrations of portions of the gating circuit of FIG. 1.

FIG. 2 shows an off-hook current in line L1 as a downward directed arrow. In response to such a current, a reverse magnetized domain is generated in the portion of wire 11 coupled by line L1. The wire 11 is assumed initialized to a direction indicated by the leftward directed arrows A1 in FIG. 2. A reverse domain then is represented as an Arrow Ar directed to the right and bounded by domain walls DW1 and DW2.

Figure 5:
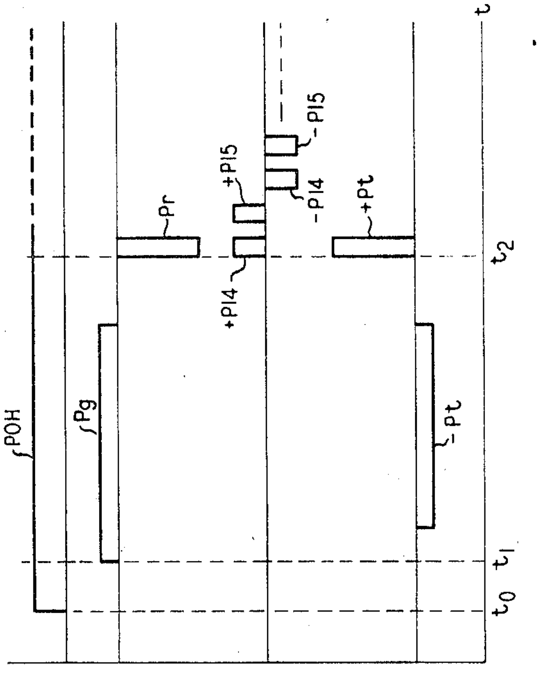
FIG. 5 is a pulse diagram of the operation of the circuit of FIG. 1.
Figure 3:
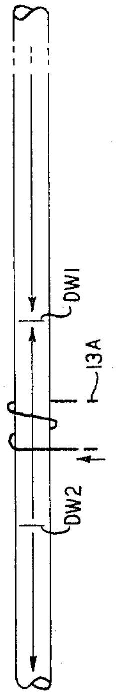

FIG. 5 is a pulse diagram of the operation of the circuit of FIG. 1. Assume that an off-hook current, designated POH in FIG. 5, is initiated at a time $t0$ in the customary fashion. Periodically, under the control of control circuit 21, a relatively low amplitude positive pulse Pg is applied to conductor 17 via gate pulse source 18 under the control of control circuit 21. The pulse Pg is shown applied at a time $t1$ in FIG. 5 and provides a field in excess of the propagation threshold to expand the domain Ar to the right as viewed in FIG. 3. A comparison of FIGS. 2 and 3 shows that the expansion of a domain is tantamount to the movement of domain wall DW1 to the right as viewed. Of course, domain wall DW2 moves to the left as viewed if conductor 17 couples the corresponding portion of wire 11. This movement, however, may be ignored as will become clear. The movement of the domain wall DW1 past transfer loop 13A causes a low level (negative) pulse —Pt, indicated by the upward directed arrows in FIG. 3, to be induced in that transfer loop. Such a pulse generates a field less than the propagation threshold in wire 12 and in a direction to drive wire 12 further into saturation in the initialized magnetization direction. Accordingly, the pulse can be ignored.

Figure 4:
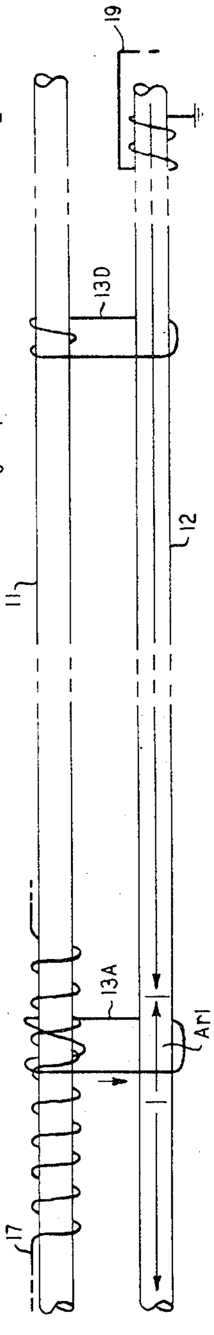

At a later time, designated $t2$ in FIG. 1, a large reset (negative) pulse Pr is applied to conductor 17, under the control of control circuit 21. Pulse Pr generates a field in excess of the nucleation threshold in wire 11 for quickly and reliably resetting the reverse domain, now expanded, to the initialized direction. In response to the large reset pulse, a large (positive) pulse +Pt is induced in the transfer loop for nucleating a reverse domain in the corresponding position of wire 12. This is shown in FIG. 4 as an arrow Ar1 directed to the right in FIG. 4.

The propagation pulse sequences, each comprising pulses designated +P14, +P15, —P14, —P15 in FIG. 5, are shown initiated at time $t2$ for moving domain Ar1 to the output position coupled by conductor 19 for detection by utiliztaion circuit 20 under the control of control circuit 21. As is well known, the pulses are applied alternately to conductors 14 and 15 as indicated by the designations. As disclosed in the aforementioned copending application, utilization circuit 20 may include an address generator which generates the address of telephone #1 as the domain Ar1 couples conductor 19. In this manner, the address of a telephone and its condition are utilized.

Clearly, line L4 includes no off-hook current and, consequently, no reverse domain is generated in the corresponding position of wire 12 during the operation.

Widely varying off-hook currents cause only negligible problems in the circuit of FIG. 1. If the amplitude of an off-hook current is insufficient to nucleate a reverse domain (Ar of FIG. 2) the gate (expand) pulse Pg aids in the provision thereof and causes reliable nucleation. If the off-hook current is very large, all that results is a relatively long reverse domain Ar that does still not reach to the corresponding transfer loop. Consequently, the circuit of FIG. 1 is quite tolerant of wide variations in off-hook currents.

Also, the fields generated by those off-hook currents do not interfere with the propagation operation in the circuit of FIG. 1. As has been discussed hereinbefore, the propagation sequence requires oppositely poled propagation fields to propagate a reverse domain. Since the off-hook current continues, once initiated, the field generated thereby, unless decoupled from the (scanner) wire 12, remains in one direction interfering with the necessary (oppositely poled) propagation fields there. In accordance with this invention, however, persistant off-hook currents are entirely decoupled from wire 12 in which an indicative reverse domain is nucleated only in response to the negative gate pulse Pr.

What has been described is considered merely illustrative of the principles of this invention and various modifications may be made thereby by one skilled in the art without departing from the scope and spirit of the invention.

What is claimed is:

1. In combination, first and second magnetic wires, transfer means coupling corresponding first positions in said wires, means for nucleating a first reverse domain in a second position in said first wire spaced apart from said first position, means for expanding said reverse domain to encompass said first position of said first wire, and means for collapsing said reverse domain for inducing a pulse in said transfer means thus nucleating a reverse domain in said first position of said second wire.

2. A combination in accordance with claim 1 wherein said first reverse domain has a stable length.

3. In combination, first and second magnetic wires of a material in which reverse domains are nucleated in response to a first field in excess of a nucleation threshold and through which reverse domains are propagated in response to a second field in excess of a propagation threshold and less than said nucleation threshold, a plurality of transfer loops coupling corresponding first positions in said wires, means responsive to input signals for selectively nucleating a reverse domain in second positions in said first wire displaced from said first positions, means for expanding reverse domains to encompass corresponding first positions in said first wire, and reset means for collapsing said reverse domains for inducing a pulse in corresponding transfer loops for nucleating reverse domains in corresponding first positions of said second wire.

4. A combination in accordance with claim 3 including means coupled to said second wire for moving reverse domains therethrough, and means coupled to a remote position of said second wire for detecting the arrival of reverse domains there.

5. A combination in accordance with claim 4 wherein said reset means comprises a conductor coupled to said first wire over lengths thereof encompassing corresponding first and second positions.

6. In combination, a magnetic wire of a material in which reverse domains are nucleated in response to a first field in excess of a nucleation threshold and in which those reverse domains are advanced in response to second fields in excess of a propagation threshold and less than said nucleation threshold, a plurality of transfer means each coupled to a corresponding first position along said wire, a plurality of input means each coupled to a second position displaced from a corresponding said first position a distance such that an input signal thereon cannot nucleate there a reverse domain which encompasses the corresponding first position, means for selectively applying input signals to said input means for generating corresponding first fields in said wire thus nucleating reverse domains, means for expanding said nucleated reverse domains in said wire to encompass corresponding first positions, and means for resetting the magnetization of said wire for inducing pulses in corresponding transfer means.

References Cited

UNITED STATES PATENTS 3,366,936 1/1968 Snyder ------------- 340—174

OTHER REFERENCES

Publication I, IBM Technical Disclosure Bulletin, vol. 4, No. 10, March 1962, pp. 32–33.

JAMES W. MOFFITT, Primary Examiner